United States Patent
Whitt et al.

(10) Patent No.: US 9,476,341 B2
(45) Date of Patent: Oct. 25, 2016

(54) EXHAUST TREATMENT SYSTEM THAT GENERATES DEBOUNCE DURATION FOR NOX SENSOR OFFSET

(71) Applicant: GM GLOBAL TECHNOLOGY OPERATIONS LLC, Deroit, MI (US)

(72) Inventors: Christopher Whitt, Howell, MI (US); Justin Adam Shetney, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 137 days.

(21) Appl. No.: 14/444,715

(22) Filed: Jul. 28, 2014

(65) Prior Publication Data
US 2016/0024988 A1    Jan. 28, 2016

(51) Int. Cl.
*F01N 3/00* (2006.01)
*F01N 11/00* (2006.01)
*F01N 3/20* (2006.01)

(52) U.S. Cl.
CPC ............. *F01N 11/00* (2013.01); *F01N 3/2066* (2013.01); *F01N 2550/02* (2013.01); *F01N 2550/05* (2013.01); *F01N 2560/026* (2013.01); *F01N 2900/0416* (2013.01); *F01N 2900/08* (2013.01); *Y02T 10/47* (2013.01)

(58) Field of Classification Search
USPC .......... 60/276, 277, 286, 295, 297, 301, 303
See application file for complete search history.

(56) References Cited

U.S. PATENT DOCUMENTS

| | | | | |
|---|---|---|---|---|
| 6,546,720 | B2 * | 4/2003 | van Nieuwstadt | B01D 53/90 60/274 |
| 8,307,699 | B2 * | 11/2012 | Sawada | F02D 41/1461 73/114.75 |
| 8,418,438 | B2 * | 4/2013 | Shimomura | F01N 3/208 60/277 |
| 8,875,490 | B2 * | 11/2014 | Geveci | F01N 3/208 60/274 |
| 8,904,756 | B2 * | 12/2014 | Yoda | F01N 3/0814 60/277 |

* cited by examiner

*Primary Examiner* — Binh Q Tran
(74) *Attorney, Agent, or Firm* — Cantor Colburn LLP

(57) ABSTRACT

An exhaust treatment system configured to treat exhaust gas generated by an internal combustion engine includes a reductant delivery system that injects a reductant solution into an exhaust gas. A selective catalyst reduction (SCR) device reacts with the reductant solution to reduce NOx from the exhaust gas. A control module is in electrical communication with the SCR device and the reductant delivery system. The control module determines at least one of an injection status of the reduction delivery system and a performance of the SCR device. The control module further determines at least one debounce time for delaying diagnosis of a NOx sensor based on at least one of the injection status and the performance of the SCR device.

16 Claims, 3 Drawing Sheets

EXHAUST TREATMENT SYSTEM THAT GENERATES DEBOUNCE DURATION FOR NOX SENSOR OFFSET

FIELD OF THE INVENTION

The present disclosure relates to exhaust gas treatment systems, and more specifically, to an exhaust gas treatment system including a diagnostic system configured to evaluate operation of a NOx sensor.

BACKGROUND

Exhaust gas emitted from an internal combustion (IC) engine is a heterogeneous mixture that may contain gaseous emissions such as carbon monoxide (CO), unburned hydrocarbons (HC) and oxides of nitrogen (NOx) as well as condensed phase materials (liquids and solids) that constitute particulate matter. Catalyst compositions typically disposed on catalyst supports or substrates are provided in an engine exhaust treatment system to convert certain, or all of these exhaust constituents into non-regulated exhaust gas components.

Exhaust gas treatment systems may include selective catalytic reductant (SCR) devices. The SCR device includes a substrate having a washcoat disposed thereon that operates to reduce the amount of NOx in the exhaust gas. The typical exhaust treatment system also includes a reductant delivery system that injects a reductant such as, for example, ammonia ($NH_3$), urea ($CO(NH_2)_2$), etc.). The SCR devices make use of the reductant to reduce the NOx. For example, when the proper amount of reductant is supplied to the SCR device under the proper conditions, the reductant reacts with the NOx in the presence of the SCR washcoat to reduce the NOx emissions.

A NOx sensor is typically disposed downstream from the SCR device to sense the level of NOx emissions in the exhaust gas stream. A NOx conversion efficiency of the SCR device can be determined based on the level of NOx that reaches the downstream NOx sensor. If the NOx sensor is performing improperly, however, an incorrect NOx efficiency may be determined such that the performance of the SCR device is misdiagnosed.

SUMMARY OF THE INVENTION

According to an exemplary embodiment, an exhaust treatment system configured to treat exhaust gas generated by an internal combustion engine includes a reductant delivery system that injects a reductant solution into an exhaust gas. A selective catalyst reduction (SCR) device reacts with the reductant solution to reduce NOx from the exhaust gas. A control module is in electrical communication with the SCR device and the reductant delivery system. The control module determines at least one of an injection status of the reduction delivery system and a performance of the SCR device. The control module further determines at least one debounce time based on at least one of the injection status and the performance of the SCR device.

In another exemplary embodiment, an electronic control module configured to diagnose a NOx sensor disposed downstream from an SCR device for reducing emissions from exhaust gas generated by an internal combustion engine comprises an electronic SCR performance module and an electronic debounce module. The SCR performance module is configured to determine a performance of the SCR device. The electronic debounce module is configured to detect an overrun condition of the engine and to determine at least one debounce time based on the performance of the SCR device after detecting the overrun condition. The control module further includes an electronic NOx sensor diagnosis module in electrical communication with the debounce module. The NOx sensor diagnosis module is configured to diagnose the NOx sensor after the at least one debounce time is satisfied.

In yet another exemplary embodiment, a method of diagnosing a NOx sensor included in an exhaust treatment system for treating exhaust gas generated by an internal combustion engine comprises injecting a reductant solution that reacts with a SCR device to reduce a level of NOx in the exhaust gas. The method further includes determining a performance of the SCR device. The method further includes determining an overrun condition of the engine, and determining at least one debounce time based on the performance of the SCR device during the overrun condition.

The above features of the invention are readily apparent from the following detailed description of the invention when taken in connection with the accompanying drawings.

BRIEF DESCRIPTION OF THE DRAWINGS

Other features and details appear, by way of example only, in the following detailed description of embodiments, the detailed description referring to the drawings in which.

DESCRIPTION OF THE EMBODIMENTS

Figure 1:
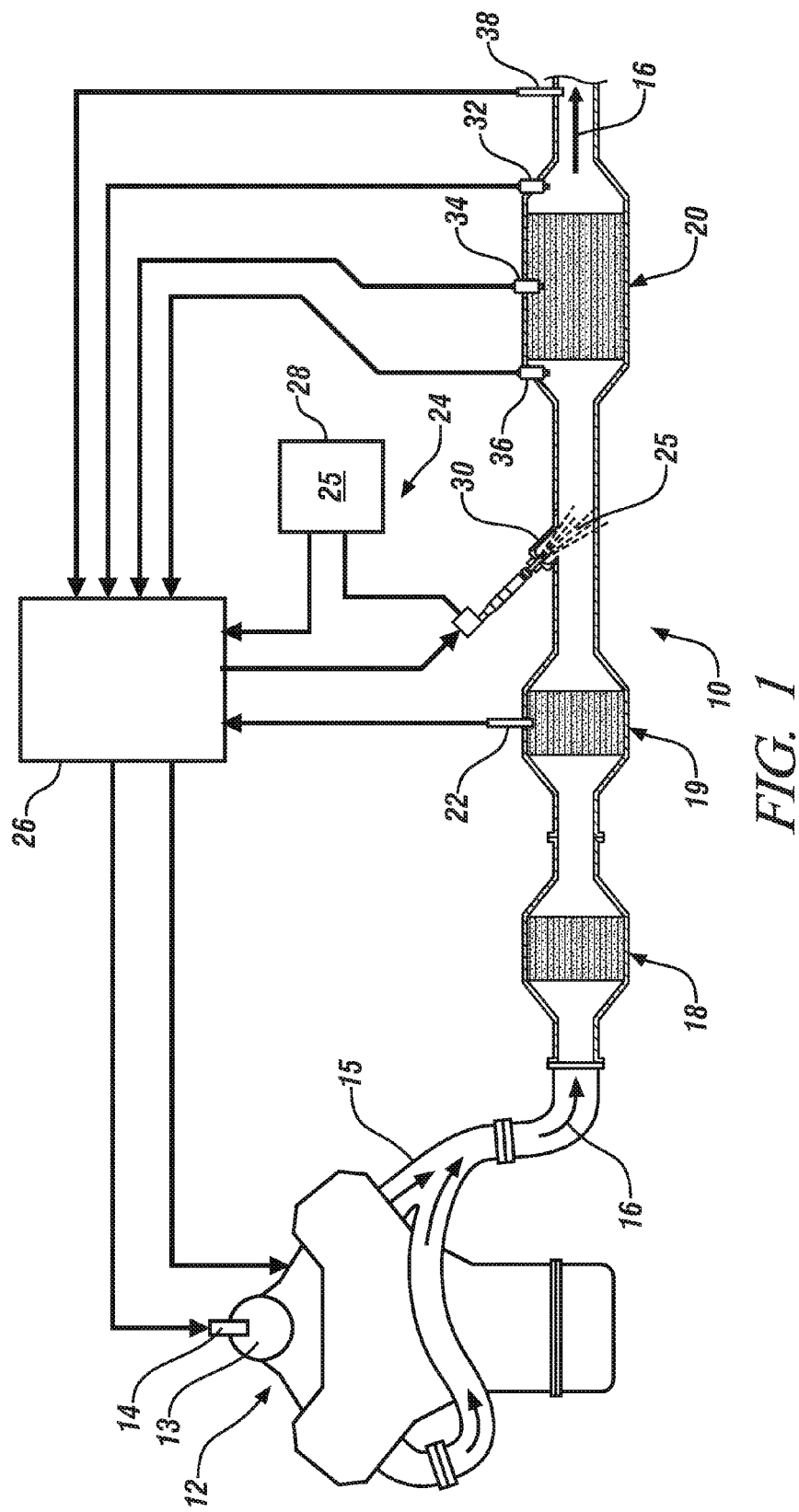
FIG. 1 is a schematic diagram of an exhaust gas treatment system including a NOx sensor diagnostic system according to an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, an electronic processor (shared, dedicated, or group) and memory that executes one or more software or firmware programs, a combinational logic circuit, and/or other suitable components that provide the described functionality.

Referring now to FIG. 1, an exemplary embodiment is directed to an exhaust gas treatment system 10, for the reduction of regulated exhaust gas constituents of an internal combustion (IC) engine 12. The engine 12 includes one or more cylinders 13, and one or more fuel injectors 14 to deliver fuel into a respective cylinder 13. The exhaust gas treatment system 10 described herein can be implemented in various engine systems. Such engine systems may include, for example, but are not limited to diesel engine systems, gasoline direct injection systems, and homogeneous charge compression ignition engine systems.

The exhaust gas treatment system 10 generally includes one or more exhaust gas conduits 14, and one or more exhaust treatment devices. The exhaust gas conduit 14, which may comprise of several segments, transports exhaust gas 16 from the engine 12 to the various exhaust treatment devices of the exhaust gas treatment system 10. The exhaust treatment devices may include, but are not limited to, an oxidation catalyst device ("OC") 18, a particulate filter ("PF") 19, and a selective catalytic reduction ("SCR") device 20. As can be appreciated, the exhaust gas treatment system 10 of the present disclosure may include various combinations of one or more of the exhaust treatment devices 18, 19, and 20 shown in FIG. 1, and/or other exhaust treatment devices (not shown) and is not limited to the present example.

In FIG. 1, as can be appreciated, the OC 18 can be one of various flow-through, oxidation catalyst devices known in the art. In various embodiments the OC 18 may include a flow-through metal or ceramic monolith substrate that is wrapped in an intumescent matte or other suitable support that expands when heated, securing and insulating the substrate. The substrate may be packaged in a stainless steel shell or canister having an inlet and an outlet in fluid communication with the exhaust gas conduit 14. The substrate can include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC 18 may treat unburned gaseous and non-volatile HC and CO, which are oxidized to form carbon dioxide and water, as well as converting NO to $NO_2$ to improve the ability of the SCR device 20 to convert NOx.

The PF 19 may be disposed downstream from the OC 18 and filters the exhaust gas 16 of carbon and other particulate matter. According to at least one exemplary embodiment, the PF 19 may be constructed using a ceramic wall flow monolith exhaust gas filter substrate that is wrapped in an intumescent or non-intumescent matte (not shown) that expands, when heated to secure and insulate the filter substrate which is packaged in a rigid, heat resistant shell or canister. The shell of the canister has an inlet and an outlet in fluid communication with exhaust gas conduit 14. It is appreciated that the ceramic wall flow monolith exhaust gas filter substrate is merely exemplary in nature and that the PF 19 may include other filter devices such as wound or packed fiber filters, open cell foams, of sintered metal fibers, for example.

Exhaust gas 16 entering the PF 19 is forced to migrate through porous, adjacently extending walls, which capture carbon and other particulate matter from the exhaust gas 16. Accordingly, the exhaust gas 16 is filtered prior to being exhausted from the vehicle tailpipe. As exhaust gas 16 flows through the exhaust gas treatment system 10, the PF 19 realizes a pressure drop across the inlet and the outlet. One or more pressure sensors 22 (e.g., a delta pressure sensor) may be provided to determine the pressure differential (i.e. Δp) across the PF 19. Further, the amount of particulates deposited in the PF 19 increases over time, thereby increasing the exhaust gas backpressure realized by the engine 12. A regeneration operation may be performed that burns off the carbon and particulate matter collected in the filter substrate and regenerates the PF 19 as understood by those of ordinary skill.

The SCR device 20 may be disposed downstream of the PF 19. The SCR device 20 includes a catalyst containing washcoat disposed thereon. The catalyst containing washcoat may chemically react with a reductant solution to convert NOx contained in the exhaust gas into $N_2$ and $H_2O$ as understood by those of ordinary skill in the art. The catalyst containing washcoat may contain a zeolite and one or more base metal components such as iron (Fe), cobalt (Co), copper (Cu) or vanadium (V) which can operate efficiently to convert NOx constituents in the exhaust gas 16 into acceptable byproducts (e.g., diatomic nitrogen ($N_2$) and water ($H_2O$)) in the presence of $NH_3$. The efficiency at which the SCR device 20 converts the NOx is hereinafter referred to as "NOx conversion efficiency."

The exhaust gas treatment system 10 illustrated in FIG. 1 further includes a reductant delivery system 24 and a control module 26. The reductant delivery system 24 introduces a reductant solution 25 to the exhaust gas 16. The reductant delivery system 24 includes a reductant supply source 28 and a reductant injector 30. The reductant supply source 28 stores the reductant solution 25 and is in fluid communication with the reductant injector 30. Accordingly, the reductant injector 30 may inject a selectable amount of reductant solution 25 into the exhaust gas 16 and at a location upstream of the SCR device 20. The reductant solution 25 may comprise an active reductant including, but not limited to, urea ($CO(NH_2)_2$), and ammonia ($NH_3$). The reductant solution 25 may be in the form of a solid, a gas, a liquid, or an aqueous urea solution. For example, the reductant solution 25 may comprise an aqueous solution of $NH_3$ and water ($H_2O$).

The control module 26 may control the engine 12, the regeneration process, and the reductant delivery system 24 based on data provided by one or more sensors and/or modeled data stored in memory. For example, the control module 26 controls operation of the fuel injector 14 to determine an amount of fuel delivered to a respective cylinder 13. In this manner, the control module 26 can determine an engine overrun condition, i.e. a time at which the vehicle travels without throttle or travels while no fuel is delivered to the cylinders 13. An overrun condition may occur, for example, when a brake is applied to slow the vehicle down to a stop (i.e. a coast-down event), or when the vehicle is traveling down-hill.

The control module 26 also controls operation of the reductant injector 30 according to a SCR performance model. The SCR performance model may determine one or more control parameters that indicate a percentage of the amount of reductant solution 25 to be injected. For example, an initial control parameter set to 1.0 may indicate that one-hundred percent (100%) of the set amount of the reductant solution 25 is to be injected into the exhaust gas 16 during an injection event. However, a subsequent control parameter set to 0.5 may indicate that 50 percent (50%) of the set amount of reductant solution 25 is to be injected.

In various embodiments, the control module 26 may determine one or more parameters ($P_1$, $P_2$, $P_3$, $P_N$) of the exhaust treatment system 10 based on one or more temperature sensors. In addition to the Δp, the control module 26 may determine a temperature ($T_{GAS}$) of the exhaust gas 16, a temperature ($T_{PF}$) of the PF 19, an amount of soot loaded on the PF 19, a temperature ($T_{SCR}$) of the SCR device 20, and the amount of $NH_3$ loaded on the SCR device 20. One or more sensors may output signals indicative of a respective parameter to the control module 26. For example, a first temperature sensor 32 may be disposed in fluid communication with the exhaust gas 16 to generate a signal indicative of $T_{GAS}$ and a second temperature sensor 34 may be coupled to the SCR device 20 to determine $T_{SCR}$.

The control module 26 also determines the NOx conversion efficiency. The NOx conversion efficiency may be measured to determine a measured NOx conversion efficiency and/or may be predicted using a model stored in memory of the control module 26. The measured NOx conversion efficiency may be based on, for example, a differential between a NOx level determined by first NOx sensor, i.e. an upstream NOx sensor 36, and a NOx level determined by a second NOx sensor, i.e. a downstream NOx sensor 38. The modeled NOx conversion efficiency may predict or determine an expected NOx conversion efficiency based on one or more input parameters. The input parameters may include one or more of the parameters ($P_1$, $P_2$, $P_3$, $P_N$) described above. The control module 26 may then utilize the NOx conversion model to predict an expected NOx conversion efficiency as a function of the one or more parameter input values, and can predict a time at which SCR device 20 is or is not likely to release NOx.

The control module 26 may utilize the NOx conversion efficiency along with the SCR performance model to predict the amount of NOx released from the SCR device 20 and/or the amount of $NH_3$ that may slip from the SCR device 20. For instance, The SCR device 20 may perform differently during various driving conditions such as, for example, fuel transient conditions (e.g., when accelerating) and overrun conditions (e.g., when coasting down). The SCR performance model determines (i.e. models) the current characteristics and performance of the SCR device 20 during various driving conditions at a given time. During an overrun condition (e.g., a coast-down event), for example, the SCR performance model determines various SCR parameters including, but not limited to, exhaust temperature and SCR temperature. Based on the SCR parameters during the overrun condition, the SCR performance model outputs one or more SCR performance values. The SCR performance values may indicate whether the SCR device 20 is likely to release NOx and/or slip $NH_3$ during the current overrun condition.

The information indicating the likelihood of the SCR device 20 to release NOx and/or slip $NH_3$ may be used to determine a debounce duration (i.e. time) for diagnosing one or more NOx sensor (e.g., the downstream NOx sensor 38) during an overrun condition. The debounce time basically delays the time at which the downstream NOx sensor 38 is diagnosed. In this manner, misdiagnosis of the downstream NOx sensor 38 caused by released NOx and/or slipped $NH_3$ that can occur during an overrun condition may be avoided.

Figure 2:
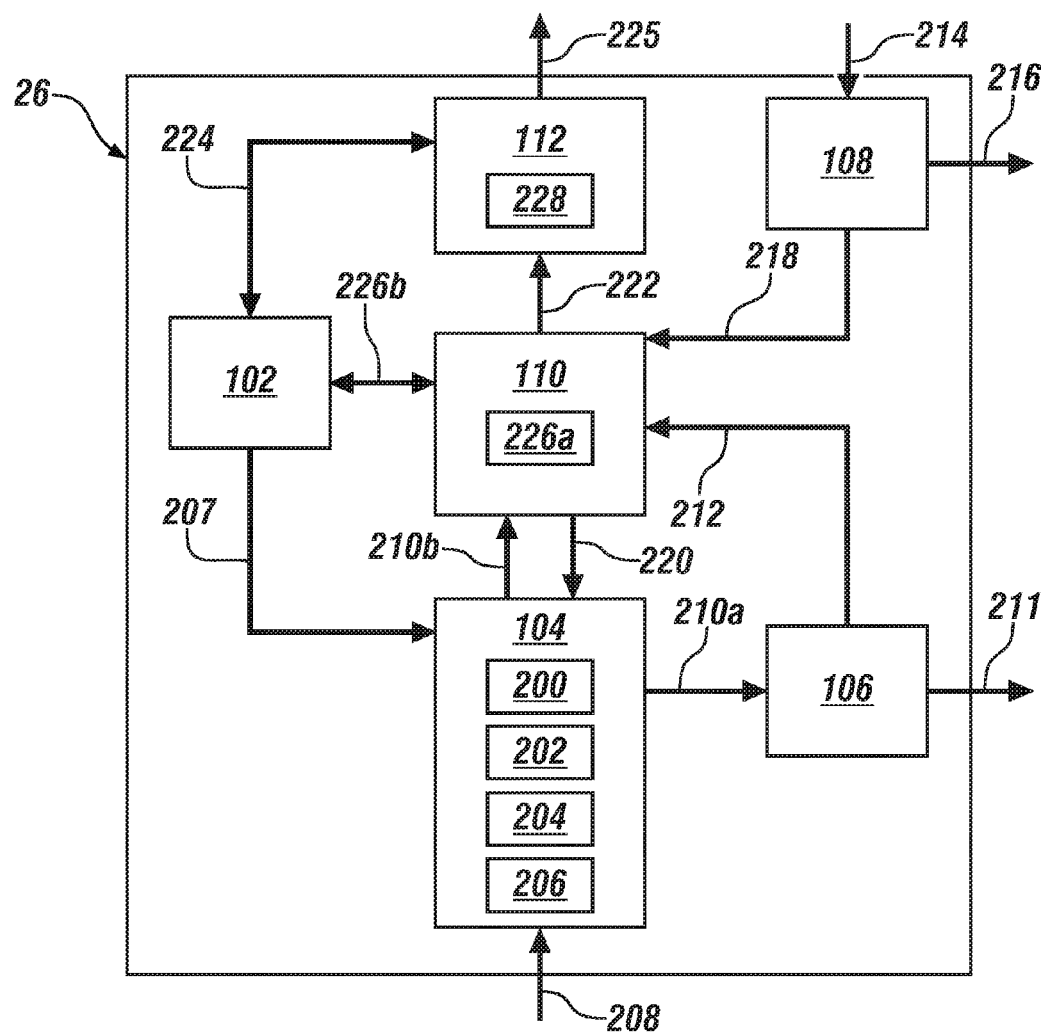
FIG. 2 is a block illustrating a control module configured to determine a debounce time for delaying diagnosis of a NOx sensor during an overrun condition.

Turning now to FIG. 2, a block diagram illustrates a control module 26 that determines one or more debounce times before diagnosing performance of a NOx sensor during an overrun condition. Although the following embodiment is described in terms of diagnosing the downstream NOx sensor 38 during a coast-down overrun event, the invention is not limited thereto. Various embodiments of the exhaust gas treatment system 10 of FIG. 1 according to the present disclosure may include any number of sub-modules embedded within the control module 26. As can be appreciated, the sub-modules shown in FIG. 2 may be combined or further partitioned as well. Inputs to the control module 26 may be sensed from the exhaust gas treatment system 10, received from other control modules, for example an engine control module (not shown), or determined by other sub-modules.

As illustrated in FIG. 2, the control module 26 according to at least one embodiment includes a memory 102, a SCR storage module 104, a reductant injector control module 106, a fuel injector control module 108, a debounce module 110, and a NOx sensor diagnosis module 112. Each of the modules 104-112 may include a respective memory unit configured to store values, parameters and/or data models as needed. In addition, each of the modules 104-112 may interface and electrically communicate with the memory 102 to retrieve and update stored values, parameters and/or data models as needed.

According to an embodiment, the memory 102 stores one or more threshold values, time periods over which the temperatures were measured, a number of configurable limits, maps, data values, variables, temperature models, and system models used to control the reductant delivery system 24. The memory 102 may also store one or more temperature thresholds and/or temperature threshold ranges corresponding to a respective soot combustion temperature. In addition, the memory 102 may store one or more temperature models for determining the SCR temperature. In at least one embodiment, the SCR temperature is modeled according to temperature signals generated by one or more of the temperature sensors and one or more temperature models stored in the memory 102.

The SCR storage module 104 determines the performance of the SCR device 20 based on various operating conditions 208 determined by various temperature sensors and/or models. As described above, a SCR performance model 207 may be obtained from memory and/or may be generated according to outputs from various sub-models including, but not limited to, a NOx conversion model 200, a reductant absorption model 202, a reductant desorption model 204, and an oxidation model 206. The sub-models 200-206 may utilize various operating conditions 208 determined by various temperature sensors and/or models. The NOx conversion model 200 may be based on, for example, age of the SCR device 20, the SCR temperature, exhaust flow rate, inlet $NO_2$ ratio, $NH_3$ storage on the SCR device 20, and inlet NOx concentration. The reductant absorption 202 may be based on, for example, the SCR temperature, exhaust flow rate, inlet $NH_3$ concentration, and $NH_3$ storage on the SCR device 20. The reductant desorption model 204 may be based on, for example, the SCR temperature, exhaust flowrate, and $NH_3$ storage on the SCR device 20. The oxidation model 206 may be based on, for example, SCR temperature, exhaust flowrate, and inlet $NH_3$ concentration.

As described above, various driving conditions may create operating conditions 208 (e.g., instant temperature of the SCR device 20, temperature gradient of the SCR device 20, etc.) that cause the SCR device 20 to release NOx and/or slip $NH_3$. During a coast-down event, for example, the SCR performance model inputs various SCR parameters including, but not limited to, exhaust flow rate and SCR temperature. Based on the SCR parameters, the SCR storage module 104 outputs one or more SCR performance values 210 which indicate whether the SCR device 20 is likely to release NOx and/or slip $NH_3$ during the current coast-down event.

The reductant control module 106 is in electrical communication with the SCR storage module 104 to receive the SCR performance values 210. The SCR performance values 210 may be used by the reductant injector control module 106 to estimate the amount of reductant (e.g., the mass of reductant) that may be effectively stored on the SCR device 20. In this manner, the reductant injector control module 106 may generate an injection control signal 211 indicating the amount of reductant solution 25 to be injected based on the SCR performance during a given driving condition. The reductant injector control module 106 is also in electrical communication with the debounce module 110, and outputs a reductant injector status signal 212 indicating the status of the reductant injector 30. For example, the reductant injector status signal 212 may indicate a reductant injection event, thereby informing the debounce module 110 a time during which the reductant solution 25 is being injected and ultimately delivered to the SCR device 20.

The fuel injector module 108 receives one or more driving condition signals 214 indicating a current driving condition of the vehicle. The driving condition signals 214 may include, but are not limited to, a throttle position signal, a mass airflow intake signal, and a brake position signal. The throttle position signal and the mass airflow intake signal may indicate a fuel transient condition such as, for example, an acceleration event. The brake position signal may indicate an overrun condition such as, for example, a coast-down event. Based on the driving condition signal 214, the fuel injector module 108 outputs a fuel control signal 216 to one or more fuel injectors 14. During a coast-down event, for example, the fuel injector may command no fuel be injected. The fuel injector module 108 is also in electrical communication with the debounce module 110, and outputs a fuel injector status signal 218 indicating the amount of fuel injected by the fuel injector 14. According to an embodiment, the fuel injector status signal 218 may be output to For example, the fuel injector status signal 218 may indicate that no fuel is injected by the fuel injector 14 at a particular time. In this manner, the debounce module 110 may detect a coast-down event (i.e. an overrun condition).

The debounce module 110 is in electrical communication with the SCR performance module 104 and the NOx diagnosis module 112. When the debounce module 110 determines that a coast-down event exists and/or no reductant is being delivered to the SCR device 20, the debounce module 110 outputs a status request signal 220 to the SCR performance module 104 and requests a performance status of the SCR device 20. In response to the status request signal, the SCR performance module generates one or more SCR performance values 210b that indicate whether the SCR device 20 is expected to release NOx and/or slip $NH_3$ during the current coast-down event. The SCR performance values 210b may also estimate an expected amount of NOx to be released and/or an expected amount of $NH_3$ to slip from the SCR device 20 during the current coast-down event.

According to an embodiment, the debounce module 110 waits (i.e. debounces" until a SCR performance value 210b indicates that that no NOx release and/or NH3 slip is predicted to be output from the SCR device 20. In response to determining that no NOx release and/or NH3 slip is predicted, the debounce module 110 outputs a diagnostic control signal 222. Although an example refers to no release of NOx or no slippage of NH3, it is appreciated that another embodiment may determine a small level of NOx and/or $NH_3$ which may be tolerated based on a tolerable threshold value. The diagnostic control signal 222 commands the NOx diagnosis module 112 to diagnose the downstream NOx sensor 38 as discussed in greater detail below.

The NOx diagnosis module 112 is in electrical communication with the debounce module 110 and waits until receiving the diagnostic control signal 222 before diagnosing the downstream NOx sensor 38. According to an embodiment, the NOx diagnosis module 112 retrieves one or more NOx threshold values 224 (e.g., 20 PPM) from the memory 102. In response to receiving the diagnostic control signal 222, the $NO_X$ diagnosis module 112 determines a difference between the $NO_X$ output determined by the downstream $NO_X$ sensor 38 and a zero-point value, and a NOx diagnosis signal 225 is output based on the comparison. For example, when the difference exceeds the predetermined $NO_X$ output threshold, the NOx diagnosis module 112 outputs a NOx diagnostic signal 225 indicating a NOx sensor fault is determined. Otherwise, the NOx diagnosis module 112 may output the diagnostic signal 225 indicating a NOx sensor pass is determined.

According to another embodiment, the difference is compared to a differential threshold, for example 5 ppm, and a NOx diagnostic signal 225 is output based on the comparison. When the difference exceeds the differential threshold, the NOx diagnosis module 112 outputs the NOx diagnostic signal 225 indicating that a NOx sensor fault is determined. Otherwise, the NOx diagnosis module 112 may output the diagnostic signal 225 indicating a NOx sensor pass is determined. It is appreciated that a fault alert may be generated when a number of detected faults exceeds a fault threshold. In this manner, a misdiagnosis of the downstream NOx sensor 38 resulting from released NOx and/or slipped $NH_3$ during certain overrun conditions may be avoided.

According to another embodiment, the debounce module 110 dynamically determines a debounce time based on a status of the reductant injector 30 and/or a performance of the SCR device 20 The debounce module 110 stores a lookup table (LUT) 226a that cross-references various predetermined SCR performance values with a respective debounce time. According to another embodiment, an LUT 226b may also be retrieved from memory 102. Based on one or more SCR performance values 210b provided by the SCR performance module 104, the debounce module 110 selects a respective debounce time, and outputs the selected debounce time to the $NO_X$ diagnosis module 112 via the diagnostic control signal 222. In this manner, the debounce time may be dynamically determined as the performance of the SCR device 20 changes.

The $NO_X$ diagnosis module 112 receives the diagnostic control signal 222 and sets a time threshold equal to the debounce time selected by the debounce module. After setting the time threshold, the NOx diagnosis module 112 initiates a timer 228. When the timer 228 exceeds the time threshold (i.e. the debounce time), the NOx diagnosis module 112 executes diagnoses the downstream NOx sensor 38. For example, when the difference NOx output exceeds the predetermined NOx output threshold (e.g., 20 ppm) a NOx sensor fault is determined. It is appreciated that a fault alert may be generated when a number of detected faults exceeds a fault threshold. As described above, the debounce time is dynamically determined before diagnosing the downstream NOx sensor 38 during an engine overrun condition (e.g., a coast-down event). Accordingly, a more accurate diagnosis of the downstream NOx sensor 38 may be achieved.

Figure 3:
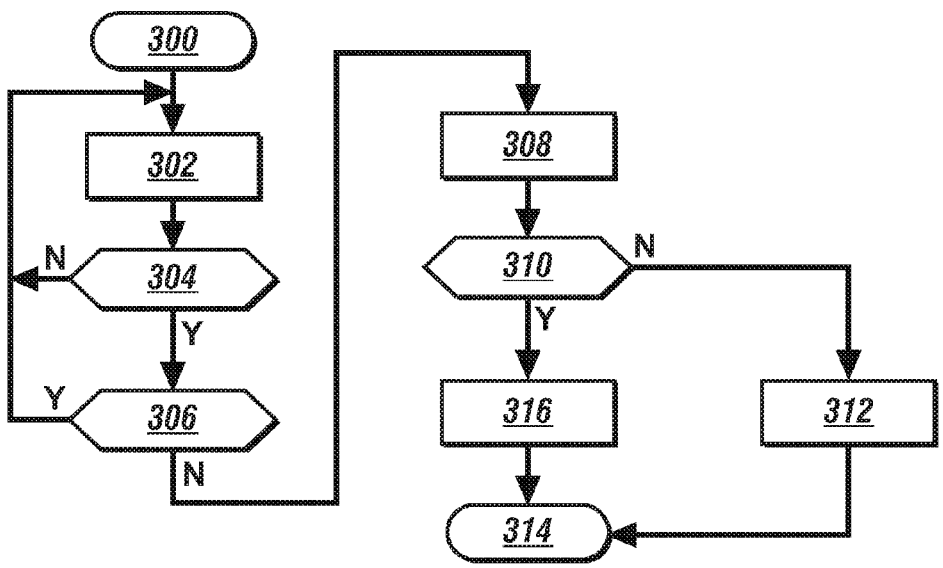
FIG. 3 is a flow diagram illustrating a method of diagnosing a NOx sensor during an overrun condition according to an exemplary embodiment.

Turning now to FIG. 3, a flow diagram illustrates a method of diagnosing a NOx sensor such as a downstream NOx sensor, for example, according to an exemplary embodiment. The method begins at operation 300, and at operation 302 an overrun condition such as, for example, a coast-down event, is detected. At operation 304, a determination is made as to whether the duration of coast-down event exceeds a coast-down duration threshold. Accordingly, it can be determined whether the coast-down event is long enough to produce a proper diagnosis of the downstream NOx sensor. When the coast-down event exceeds the coast-down duration threshold, the method proceeds to operation 306. Otherwise, the method returns to operation 302 and continues detecting overrun conditions such as, for example, subsequent coast-down events.

At operation 306, a determination is made as to whether NOx will be released from a SCR device and/or whether NH₃ will slip from the SCR device. When it is predicted that NOx will be released and/or whether NH₃ will slip, the method returns to operation 302 and continues detecting overrun conditions such as, for example, subsequent coast-down events. When, however, no NOx is predicted to be released and/or no NH₃ is predicted to slip, the method proceeds to operation 308 and determines the NOx output from the downstream NOx sensor. At operation 310, a determination is made as to whether the NOx output exceeds a NOx output threshold. When the NOx output does not exceed the NOx output threshold, a pass event is determined at operation 312 and the method ends at operation 314. When, however, the NOx output exceeds the NOx output threshold, a fault event is determined at operation 316 and the method ends at operation 314. Although the method is illustrated as ending after determining a pass or fail event, it is appreciated that the method may return to operation 302 after determining a pass or fail event to continue monitoring for overrun conditions such as, for example, subsequent coast-down events.

Figure 4:
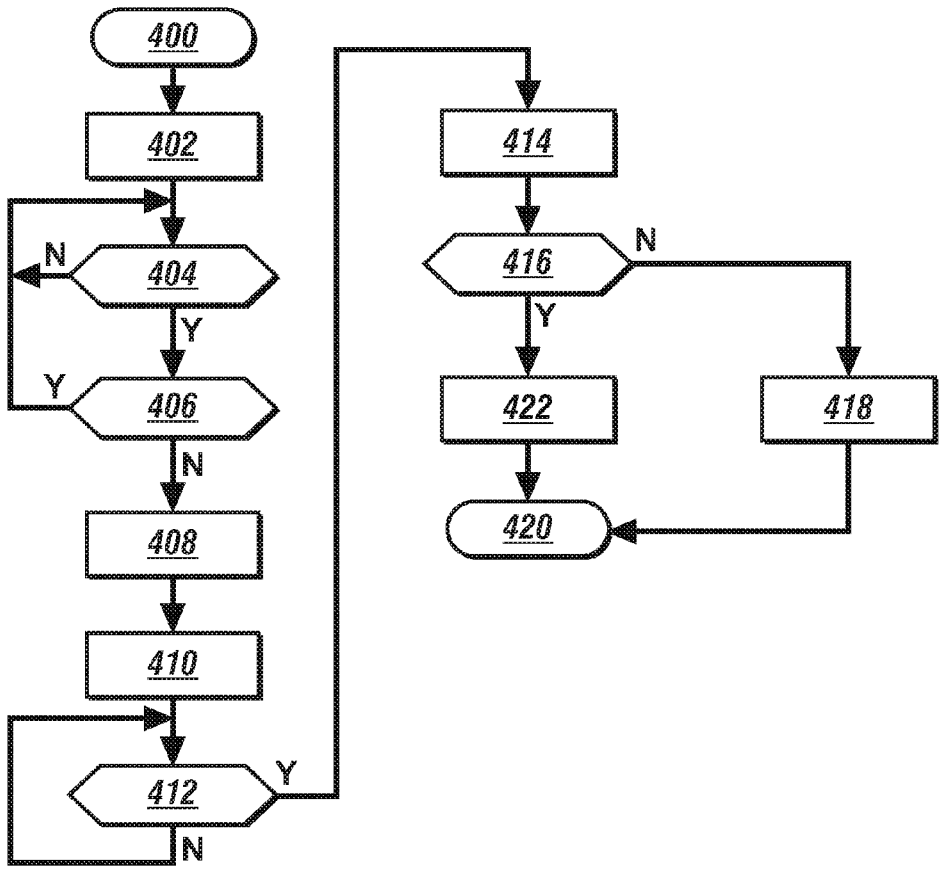
FIG. 4 is a flow diagram illustrating a method of diagnosing a NOx sensor according to another exemplary embodiment.

Turning now to FIG. 4, a flow diagram illustrates a method of diagnosing a NOx sensor such as a downstream NOx sensor, for example, according to another exemplary embodiment. The method begins at operation 400, and at operation 402 a NOx output threshold is determined. The NOx output threshold may be set at, for example, 15 parts per million (PPM). At operation 404, a determination as to whether an overrun condition such as, for example, a coast-down event occurs. When an overrun condition is not determined, the method continues monitoring for an overrun condition at operation 404. When, however, an overrun condition is determined, the method determines whether a reductant solution is injected into the exhaust gas at operation 406. When a reductant solution is injected, the method returns to operation 404 and continues monitoring for an overrun condition. When, however, no reductant solution is injected, a current performance of the SCR device is determined at operation 408. The current performance during a respective overrun condition can be determine using an SCR performance model as described in detail above.

At operation 410, a debounce time is dynamically selected based on the current performance of the SCR device. At operation 412, a determination is made as to whether the selected debounce time is satisfied. If the debounce time is not satisfied, the method returns to operation 412 and continues waiting for the debounce time to be satisfied. When, however, the debounce time is satisfied, the NOx output from the downstream NOx sensor is determined at operation 414. A debounce time can be determined as being satisfied when a timer exceeds the selected debounce time. At operation 416, a determination is made as to whether the NOx output exceeds a NOx output threshold. When the NOx output does not exceed the NOx output threshold, a pass event is determined at operation 418 and the method ends at operation 420. When, however, the NOx output exceeds the NOx output threshold, a fault event is determined at operation 422 and the method ends at operation 420. Although the method is illustrated as ending after determining a pass or fail event, it is appreciated that the method may return to operation 402 after determining a pass or fail event to continue monitoring for subsequent overrun conditions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust treatment system configured to treat exhaust gas generated by an internal combustion engine, the exhaust treatment system comprising:
    a reductant delivery system configured to inject a reductant solution into an exhaust gas;
    a selective catalyst reduction (SCR) device that reacts with the reductant solution to reduce NOx from the exhaust gas;
    a NOx sensor disposed downstream from the SCR device, the NOx sensor configured to determine a level of the NOx in the exhaust gas; and
    an electronic engine control module in electrical communication with the SCR device and the reductant delivery system, the control module configured to determine at least one of an injection status of the reduction delivery system and a performance of the SCR device, and to determine at least one debounce time based on at least one of the injection status and the performance of the SCR device, the engine control module comprising:
    an electronic SCR performance module configured to determine the performance of the SCR; and
    an electronic debounce module configured to determine the at least one debounce time based on the performance of the SCR device during the overrun condition,
    wherein the debounce module dynamically selects a first debounce time from among a plurality of debounce times based on at least one of an amount of NOx released from the SCR device during the overrun condition and an amount of ammonia (NH₃) slipped from the SCR device during the overrun condition, and
    wherein the engine control module outputs an electronic control signal that triggers a fault alert when a number of detected faults corresponding to the NOx sensor exceeds a predetermined threshold value during the determined debounce time.

2. The exhaust treatment system of claim 1, wherein the control module detects an overrun condition of the engine prior to determining the at least one debounce time, and diagnoses the NOx sensor after the at least one debounce time is satisfied.

3. The exhaust treatment system of claim 1, wherein the control module further includes an electronic NOx sensor diagnosis module that diagnoses the NOx sensor after the selected first debounce time is satisfied.

4. The exhaust treatment system of claim 3, wherein the NOx sensor diagnosis module diagnoses the NOx sensor based on a difference between the level of NOx in the exhaust gas and a zero-point threshold.

5. The exhaust treatment system of claim 4, wherein the NOx sensor diagnosis module determines the fault event corresponding to the NOx sensor in response to the difference exceeding a NOx threshold value.

6. An electronic engine control module configured to diagnose a NOx sensor disposed downstream from an SCR device for reducing emissions from exhaust gas generated by an internal combustion engine, the engine control module comprising:
    an electronic SCR performance module configured to determine a performance of the SCR device;

an electronic debounce module in electrical communication with the SCR performance module, the debounce module configured to detect an overrun condition of the engine and to determine at least one debounce time based on the performance of the SCR device after detecting the overrun condition; and an electronic NOx sensor diagnosis module in electrical communication with the debounce module, the NOx sensor diagnosis module configured to delay diagnosing the NOx sensor until after the at least one debounce time is satisfied, wherein the electronic debounce module stores a lookup table (LUT) that cross-references a plurality of stored debounce times with a respective SCR performance value, and wherein the debounce module dynamically selects a stored debounce time from the LUT based on a current performance value determined by the SCR performance module.

7. The engine control module of claim 6, wherein the electronic debounce module further determines an injection event that delivers reductant solution into the exhaust gas and determines the at least one debounce time based on the performance of the SCR device and the injection event.

8. The engine control module of claim 6, wherein the SCR performance value is based on at least one of an amount of NOx released from the SCR device during the overrun condition and an amount of ammonia ($NH_3$) slipped from the SCR device during the overrun condition.

9. The engine control module of claim 8, wherein the electronic NOx diagnosis module diagnoses the NOx sensor based on a difference between a level of NOx determined by the NOx sensor and a zero-point threshold.

10. The engine control module of claim 9, wherein the electronic NOx diagnosis module determines a fault event corresponding to the NOx sensor in response to the difference exceeding a NOx threshold value.

11. A method of diagnosing a NOx sensor included in an exhaust treatment system for treating exhaust gas generated by an internal combustion engine, the method comprising:
in an engine control module programmed to execute control of diagnosing the NOx sensor, the engine control module performing the operations of:
controlling a reductant delivery system to inject a reductant solution that reacts with a SCR device to reduce a level of NOx in the exhaust gas;
determining a performance of the SCR device;
determining an overrun condition of the engine;
dynamically selecting, by the engine control module, a first debounce time from among a plurality of stored debounce times based on at least one of an amount of NOx released from the SCR device during the overrun condition and an amount of ammonia ($NH_3$) slipped from the SCR device during the overrun condition.

12. The method of claim 11, further comprising determining, by the engine control module, a time of injecting the reduction solution, wherein the determining at least one debounce time is further based on the time of injecting the reduction solution.

13. The method of claim 12, wherein the debounce time delays diagnosis of a NOx sensor disposed downstream from the SCR device.

14. The method of claim 11, further comprising diagnosing, by the engine control module, the NOx sensor after the selected first debounce time is satisfied.

15. The method of claim 14, further comprising diagnosing, by the engine control module, the NOx sensor based on a difference between the level of NOx in the exhaust gas and a zero-point threshold.

16. The method of claim 15, further comprising determining, by the engine control module, a fault event corresponding to the NOx sensor in response to the difference exceeding a NOx threshold value.

* * * * *